July 31, 1956 L. B. PETTIT 2,756,512
ANGLE GUIDE ATTACHMENT FOR POWER DRILLS AND LIKE TOOLS
Filed Sept. 3, 1954 2 Sheets-Sheet 1
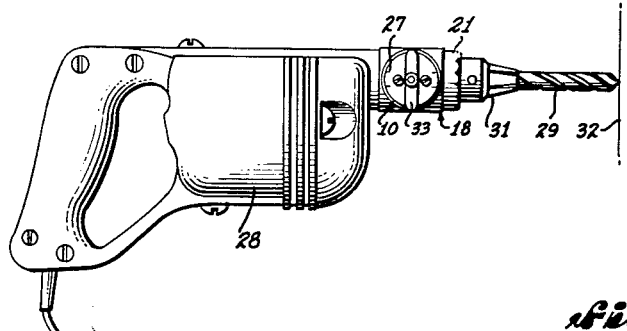
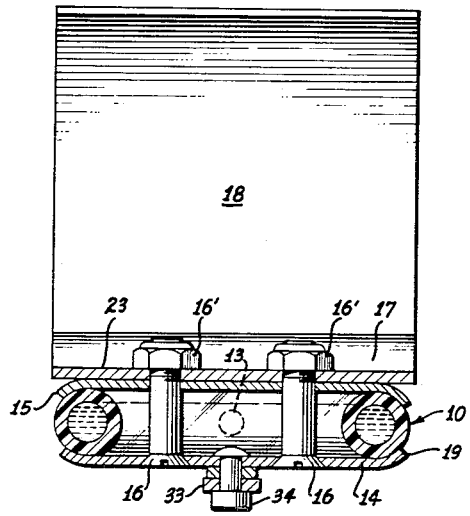
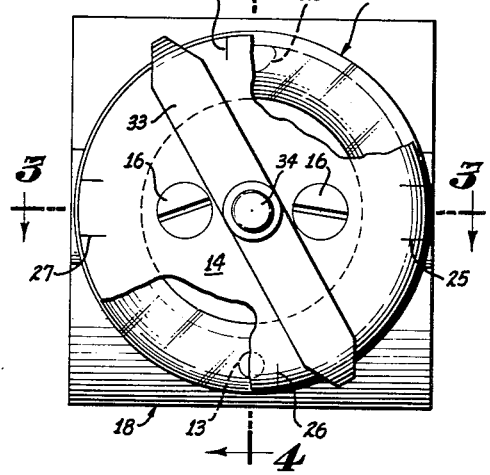
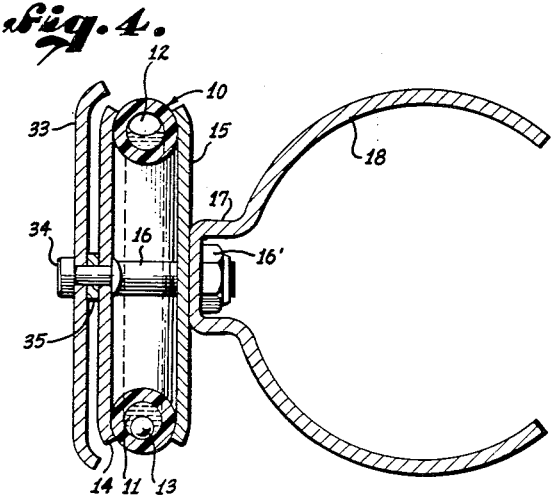
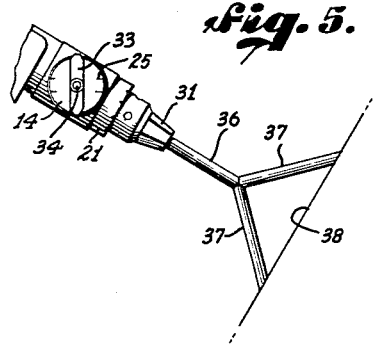
LELA B. PETTIT,
INVENTOR.
ATTORNEY

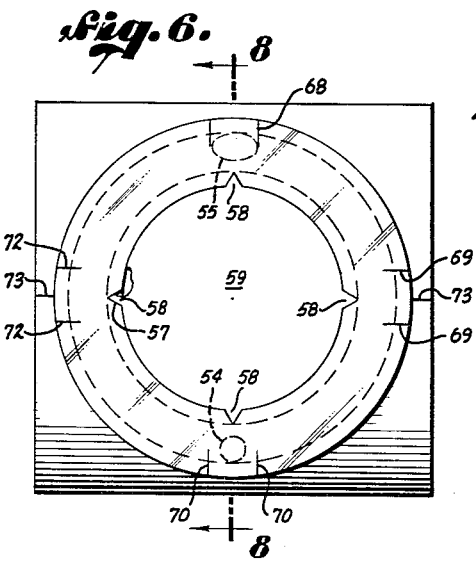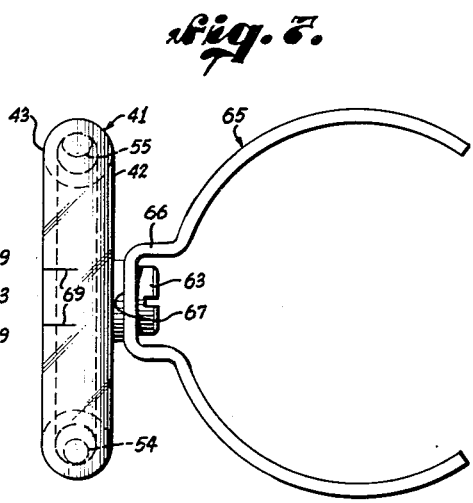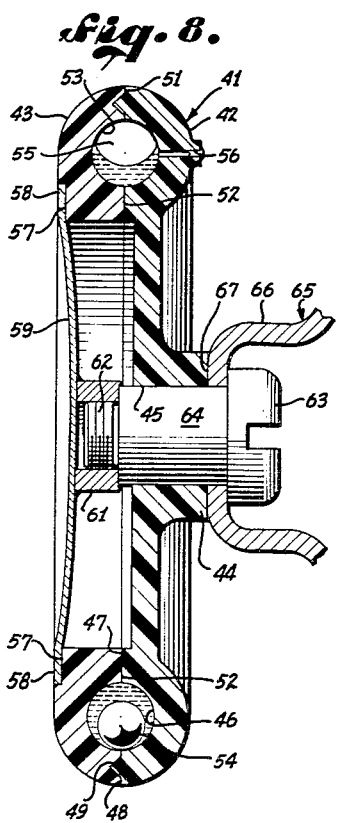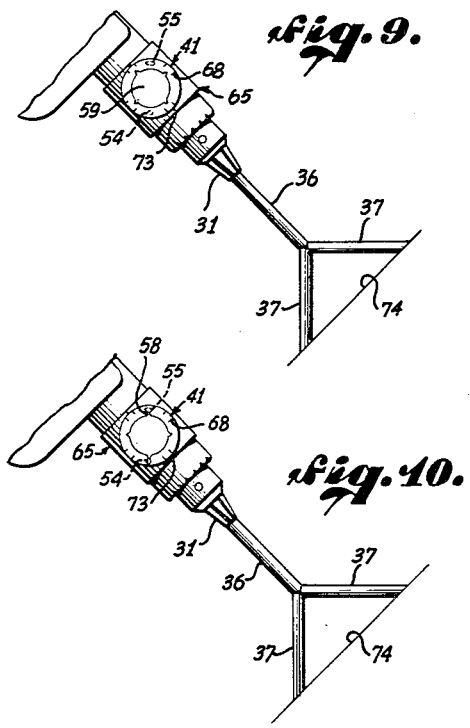

United States Patent Office 2,756,512
Patented July 31, 1956

2,756,512

ANGLE GUIDE ATTACHMENT FOR POWER DRILLS AND LIKE TOOLS

Lela B. Pettit, Venice, Calif.

Application September 3, 1954, Serial No. 454,141

6 Claims. (Cl. 33—207)

This invention relates to angle guide attachments particularly adapted for use with boring tools such as portable power drills and similar tools. The guide attachment of the present invention is primarily intended for determining whether or not the bit of a drill is held perpendicular to the surface of a workpiece regardless of the attitude of the surface.

It is difficult for an operator of a portable power drill, for example, to so hold the tool as to insure that the bit is entering the workpiece at an angle normal or perpendicular to the surface of the workpiece. This difficulty has long been recognized and various spirit level and other attachments have been heretofore proposed for use with such tools for indicating the angle to which the bit is held relative to the workpiece. These prior attachments have been, in some instances, a difficult to mount in operative position on the drill or, if easily mounted, many times interfered with the handling and operation of the drill. Furthermore, they were difficult to use, if not inoperative for their intended purpose, where the drill was held in an overhead position for then the bubble was not visible to the operator.

The attachment of the present invention is very easily mounted to any drill having a guard sleeve circumscribing the chuck of the drill and, once attached or mounted, does not interfere with the operation of the drill. To this end the attachment comprises a resilient clamp element adapted to be telescopically mounted to the sleeve of the drill. The clamp is formed as a split ring to provide a C-clamp of substantial width which very securely mounts the attachment without the necessity of altering the drill in any manner. The clamp is formed with internal wall means which, when mounted to the drill, is concentric with the sleeve, which in turn is concentric with the axis of the drill chuck.

A spirit level in the form of an annular or toroidal member formed of a transparent material is so carried by the clamp as to project laterally therefrom in a plane substantially parallel to the longitudinal axis of the clamp. The toroidal member is substantially filled with a suitable liquid to form an air bubble. Also carried within the toroidal member is a small ball or the like of such a size that the same freely rolls about the passage of the toroidal member. The ball seeks a position diametrically opposite the bubble and thus is visible as a reference member where the drill is operated over the head of the user.

The attachment is formed with suitable index marks to coact with the reference members formed by the bubble and ball to indicate when the attachment is mounted to the drill, vertical and horizontal planes passing through the longitudinal axis of the clamp and consequently the chuck axis. These index marks, when the surface of the workpiece is known to be horizontal or vertical in space, are used to indicate the position of the drill bit relative to the surface of the workpiece.

In one embodiment of the present invention herein illustrated, the spirit level is fixedly carried by the mounting clamp and the bubble and ball thereof coact, where the surface of the workpiece is neither horizontal or vertical, with a movable index element. In this use of the attachment the axis of the chuck is located perpendicular to the angular surface of the workpiece and the movable index element adjusted to a selected position registering with the then position of either the bubble or the ball, after which the drill bit is mounted in the chuck and the drill held in position in which the bubble or ball is again properly aligned with the preselected position of the movable index element.

In a second embodiment herein illustrated, the spirit level is mounted to the clamp for coaxial rotational movement in the use of the attachment when the surface to be drilled extends at an angle to the horizontal. In the use of this embodiment, the axis of the chuck is again located normal to the angular surface, after which the spirit level is rotated to move index marks carried thereby into a position which can be thereafter used with the bubble or ball to properly locate the axis of a drill bit relative to the angular surface.

Other features and advantages of the present invention will be hereinafter apparent from the following description, particularly when taken in connection with the accompanying drawing, in which Figure 1 is an elevational view of a portable power drill showing the attachment of the present invention mounted thereto;

Figure 2 is an elevational view of the attachment with some portions broken away to more clearly illustrate the component parts of the attachment;

Figure 3 is a section taken along line 3—3 of Figure 2;

Figure 4 is a section taken along line 4—4 of Figure 2;

Figure 5 is a fragmentary view showing the attachment mounted to a drill with an auxiliary locating tool mounted in the chuck of the drill;

Figure 6 is a view similar to Figure 2 but illustrates a modified form of the attachment;

Figure 7 is an elevational view of the embodiment shown in Figure 6;

Figure 8 is a section on an enlarged scale taken along line 7—7 of Figure 6;

Figure 9 is a fragmentary view showing the modified embodiment of the attachment mounted to the sleeve of the drill with an auxiliary locating tool mounted in the chuck of the drill; and Figure 10 is a view similar to Figure 9 but showing the attachment in an adjusted position to show that the chuck axis extends normal to an angular surface.

The embodiment of the present invention shown in Figures 1 through 4 of the drawing comprises a spirit level 10 in the form of an annular or toroidal element formed of a clear, transparent material such as a high impact polystyrene. In this form of the spirit level a hollow tubular member is formed into the toroidal shape and the opposite end faces thereof are bonded together by a clear cement. The toroidal member is substantially filled with a suitable liquid, such as kerosene, to form an air bubble indicated by the reference character 12. Whatever liquid is used the same may be colored if desired so long as the liquid remains transparent. Also carried within the toroidal member is a small ball 13 preferably formed of a suitable metal. The ball has a diameter less than the diameter of the annular passage of the toroidal member 10 and thus freely rolls within the member.

A pair of discs 14 and 15 each having a diameter slightly less than the outer diameter of the toroidal member 10 are mounted on opposite sides thereof and held in position by a pair of bolts 16, the threaded ends of which are passed through openings in a U-shaped formation 17 formed integral with a band 18. The ends of the bolts 16 threadedly mount a pair of nuts 61, which, when tightened, not only compressively mount the annular spirit level 10 intermediate the discs 14 and 15, but also secures the discs and level to the band 18. To hold the annular or toroidal level against movement relative to the discs, the peripheral edge of each disc is curved or dished inwardly, as indicated at 19, to thus confine the level.

The band 18 is formed of a resilient metal and takes the form of a split ring or C-shaped clamp, as clearly shown in Figure 4 and presents internal wall means of cylindrical contour. The clamp, referring now to Figure 1, is adapted to be telescopically secured about the guard sleeve 21 of a portable power drill 28 by slipping the clamp over the free end of the sleeve and then moving the same longitudinally thereof toward the body of the drill. The clamp very securely mounts the level to the drill for the normal diameter of the internal wall of the clamp is preferably less than the diameter of the sleeve 21. As the sleeve 21 is substantially concentric with the chuck of the drill, the clamp formed by the band 18, once it is mounted to the sleeve, will be also concentric with the chuck axis.

The U-shaped projection or formation 17 is formed medially of the clamp, as best seen in Figure 4, with a planar surface 23 lying laterally of the body of the clamp and in a plane substantially parallel to the axis of the clamp. As the surface 23 is facewisely engaged by the disc 15, the level 10 is held to the clamp so as to be substantially parallel to the chuck axis. In other words, the axis of the toroidal member forming the level is substantially perpendicular to the axis of the chuck and consequently the axis of a drill bit mounted within the chuck.

The discs 14 and 15 are formed with scribed or engraved pairs of lines 24, 25, 26 and 27, each pair being positioned at the quadrantal points of the discs. The pairs of lines, as will be hereinafter seen, serve as index members coacting with the reference means formed by the bubble 12 and the ball 13. The lines, in the use of the attachment, indicate normally intersecting planes passing through the longitudinal axis of the clamp and consequently the axis of the drill chuck. The lines are located relative to the longitudinal axis of the clamp through accurate formation of the openings formed in the discs 12 and 15 and the planar section of the projection 17 passing the bolts 16. Thus, once the discs are secured by the bolts 16, as above described, the pairs of lines will be properly located relative to normally intersecting planes passing through the longitudinal axis of the clamp.

With the attachment mounted to a drill 28, as illustrated in Figure 1 of the drawing, the operator, by holding the drill so that the bubble 12 is properly aligned with the uppermost pairs of lines 24, will maintain a drill bit 29, mounted in the socket 31 of the drill, in position to form an opening substantially normal or perpendicular to the vertical surface indicated by the reference character 32. If the operator intends to drill an opening in an overhead, horizontally disposed surface, he manipulates the drill in a conventional manner and by properly aligning the index lines 27 with the ball 13, he will be assured that the drill bit is held substantially perpendicular to the overhead horizontal surface. The index lines 27 would also be used with the bubble 12 where the drill was used to bore an opening perpendicular to a horizontal surface below the eyes of the drill operator.

As the clamp can be rotated relative to the sleeve of the drill, the spirit level can be bodily moved about the drill sleeve to avoid interference with fixed objects mounted adjacent the surface of the workpiece to be drilled. For example, in Figure 1 the spirit level is mounted to the rightward side of the drill, but could be rotated 180° to the leftward side in which case the lines 26 would coact with the bubble to indicate the perpendicular position of the drill bit relative to the vertical work surface.

The attachment of the present invention can also be used to locate the drill bit 29 perpendicular to a surface which is neither vertical or horizontal through the use of a movable index member 33 and an auxiliary tool. This index member is mounted to the disc 14 by a fastener element 34 passed through an opening centrally formed in the disc 14 and an opening formed in the index element 33 intermediate the ends thereof. A suitable spacing element 35 sleeving the fastener 34 can be used to hold the index element 33 spaced from the disc 14. It will thus be seen that the index element 33 is mounted for movement about an axis coincident with the axis of the toroidal member 10.

Where the surface of the workpiece is angularly related to the vertical, an auxiliary tool, here illustrated in Figure 5 of the drawing and comprising a shank 36 to be mounted within the chuck of the drill, is used to locate the chuck axis perpendicular to the angular surface. This locating tool comprises a pair of locating elements 37 each extending outwardly from the shank 36 at an angle of 45° to the longitudinal axis thereof. The locating elements 37 are formed at their free ends with planar surfaces extending normal to the axis of the shank 36. With the locating tool mounted in the chuck of the drill and with the end faces of the elements 37 engaged with the angular surface 38, the index element 33 would be rotatably moved to bring the opposite ends thereof into alignment with the bubble 12 and the ball 13.

The locating tool is now removed from the chuck 31 of the drill and the proper drill bit substituted. The operator of the drill now holds the same in position in which the bubble and ball are again aligned with the opposite ends of the index element 33 which, as should now be understood, insures that the axis of the drill bit is now perpendicular to the angular surface 38.

To facilitate the proper alignment of the opposite ends of the index element 33 with the bubble and ball, respectively, it is now preferred to form the end of the index member to be aligned with the bubble with an end face substantially equal to the length of the bubble. The opposite end of the index element is formed with an end face of a smaller extent and substantially equal to the diameter of the ball 13.

In the embodiment of the invention shown in Figures 6 through 8 of the drawing the spirit level 41 is again toroidal in shape. The toroidal member is here formed of two molded elements 42 and 43 formed from a suitable transparent material such as a high impact polystyrene. The element 42 is somewhat disc-shaped, having an enlarged central boss provided with a longitudinally extending cylindrical bore 45. Integrally formed about the periphery of the element 42 is a circular enlargement 46, semi-cylindrical in cross section, presenting a spaced pair of concentrically arranged circular faces 47 and 48. The surface 48 is formed during the molding process with a plurality of prongs 49 and which form, as will be hereinafter explained, elements for locating the element 43 relative to the element 42.

The element 43 comprises an annular element having an outer diameter equal to the diameter of the enlargement 46 and formed with a pair of concentrically arranged circular faces 51 and 52 adapted to facewisely engage with the faces 47 and 48 of the element 42. The element 43 presents a semicylindrical annular groove 53 which, when the elements 42 and 43 are assembled as shown in Figure 8, forms with the semi-cylindrical enlargement 46 an annular passage having a circular cross sectional shape.

In the assembly operation forming the toroidal spirit level of this form of the invention, the elements 42 and 43 are bonded together with a suitable cement and the prongs 49, seating in correspondingly shaped depressions provided in the face 51, locate the elements 43 in a predetermined relationship for a purpose which will be hereinafter more fully explained.

Before the elements 42 and 43 are assembled and the faying surfaces bonded together, a small metallic ball 54, similar to the ball 13 of the previously described embodiment, is mounted within the annular passage formed by the assembled elements. Once the elements 42 and 43 with the ball enclosed have been bonded together, as above described, the annular passage is substantially filled wtih a suitable liquid to form a bubble 55. This liquid is introduced through a filler passage 56 formed in the element 42, after which the passage is closed and sealed by application of a heated tool.

A plurality of depressions 57 are spacedly formed about the inner peripheral edge of the element 43 which depressions receive correspondingly shaped tabs 58 radially extending from a disc 59 of a diameter equal to the inner diameter of the element 43. Fixed to the inner face of the disc 59 is a securing element in the form of a nut 61 adapted to receive a reduced threaded extension 62 of a screw or bolt 63 having a shank element 64 of a diameter substantially equal to the cylindrical inner wall surface 45 of the element 42. The bolt 63 is used to mount the toroidal spirit level to a split ring clamp 65 similar to the clamp 18 of the first described embodiment. The clamp 65 is formed with a U-shaped projection 66 presenting a planar surface 67 to be facewisely engaged by the boss 44 of the element 42. The shank 64 of the bolt is passed through a centrally located opening in the projection 66 after which the reduced threaded portion 62 is engaged with the threads of the nut 61 to clamp the disc 59 with the tabs 58 properly seated in the notches 57 against the element 43 of the toroidal level.

It will thus be seen that the toroidal level is rotatably carried by the clamp 65 and will rotate about an axis coincident with the axis of the shank 64 which, as best seen in Figure 7, normally intersects the longitudinal axis of the clamp 65. The disc 59 is preferably formed of a resilient metal and is dished inwardly by the bolt 63 as it is threaded into the nut 61. The disc thus acts as a spring element to resiliently bind the engaged threads of the nut and bolt and also holds the head of the bolt tightly against the inner face of the projection 66. It should now be understood that the particular structure used to mount the level for rotation also acts to hold the level against accidental rotation.

The elements 42 and 43, forming the body of the level, are each formed, during the molding process, with pairs of lines spaced 90° apart around the periphery of each member. The pairs of lines are so formed on the elements 42 and 43 that the lines on one element coincide with the corresponding lines on the other element once the elements are oriented relative to each other by reception of the projections 49 of the element 42 in the recesses formed in the face 51 of the element 43. The coinciding lines on the two elements actually form index lines 68, 69, 70 and 72 arranged at the quadrant points of the spirit level. It will thus be seen that the projections 49 and the recesses of the element 43 serve as locating means for ease of accurate assembly of the elements 42 and 43.

As the lines are formed on the body of the level itself, which is rotatably mounted to the clamp, they do not in and of themselves locate horizontal and vertical planes fixed in space. The face 67 of the projection 66 is accurately scribed with index lines 73 adjacent the marginal edges thereof. The index lines 73 lie on opposite sides of a plane passing through the longitudinal axis of the clamp 65 and can be aligned with the tabs 58 of the disc 59 which, it will be remembered, rotates with the toroidal body of the spirit level. When the clamp 65 is telescopically mounted to the sleeve of the drill and the toroidal member is rotated to align the tabs 58 medially of the index lines 73, the pairs of lines 68 and 71 will define a vertical plane normally intersecting the plane containing the longitudinal axis of the clamp and proper alignment of the bubble or ball with the lines 68 and 70 can now be used to insure that a drill bit is perpendicular to either a horizontal or vertically disposed surface. In this use of the embodiment the attachment would be used in substantially the same manner as is the earlier described embodiment and in which the fixed pairs of lines 24–27 served as the index elements coacting with the reference means formed by the bubble and ball.

When the embodiment now being described is used to locate the axis of a drill relative to an angular work surface such as indicated at 74, in Figure 9, the locating auxiliary tool is first mounted in the chuck of the drill and the end faces of the elements 37 placed in engagement with the surface 74. The entire bubble level is now rotated from the position of Figure 9 to that illustrated in Figure 10 in which diametrically opposite pairs of the tabs 58 are aligned with the bubble and ball respectively. Here again the auxiliary tool will now be dismounted from the chuck and the drill bit substituted, after which the drill would be held so that once again the diametrically opposite pairs of blanks 58 are again aligned with the bubble and ball, respectively. With the drill held in this position the user is assured that the axis of the drill is normal or perpendicular to the surface 74.

It will now be seen that the attachment of the present invention provides an easily mounted guide attachment for use with a portable drill or like tool for quickly and efficiently indicating whether the axis of the drill bit is entering the work surface at an angle normal to that surface. With the use of the auxiliary locating tool, the attachment can be used to locate the drill bit normal to the surface even though the surface is neither horizontal or vertical.

Although the now preferred embodiments of the present invention have been shown and described herein, it is to be understood that the invention is not to be limited thereto, for it is susceptible to changes in form and detail within the scope of the appended claims.

I claim:

1. In an attachment for power drills, comprising: a resilient clamp having internal cylindrical wall means and adapted to be telescopically mounted to the sleeve circumscribing the chuck of a drill with the cylindrical wall means thereof concentric with the surface of the sleeve; a hollow toroidal member of transparent material substantially filled with a liquid to form an air bubble; a ball within said level and freely rollable within said liquid; means for mounting said toroidal member to said clamp for rotation about an axis coincident with the axis of said toroidal level and normally intersecting the longitudinal axis of said cylindrical wall means; index marks carried about said toroidal member; and aligning marks carried by said clamp and defining a plane passing through the longitudinal axis of said cylindrical wall means and coacting with said index marks to orient said toroidal member in a selected position relative to the longitudinal axis of said cylindrical wall means.

2. An attachment as defined in claim 1 in which the mounting means includes means movable with the spirit level formed by said toroidal member and coacting with said bubble and ball to re-orient said level relative to a predetermined position of the longitudinal axis of said cylindrical wall means relative to a work surface.

3. An attachment for power drills and like tools, comprising: a resilient clamp having internal cylindrical wall means and adapted to be telescopically mounted to the sleeve circumscribing the chuck of a drill; a lateral projection carried by said clamp; a hollow toroidal member of transparent material substantially filled with a liquid to form an air bubble; means for detachably mounting said toroidal member to said projection for coaxial rotation, said rotational axis normally intersecting the longitudinal axis of said cylindrical wall means; index means carried by said toroidal member and defining normally intersecting planes; and aligning means carried by said projection and coacting with means movable with said toroidal member for orienting said toroidal member whereby said toroidal member may be rotated to a position in which the one plane defined by said index means passes through the longitudinal axis of said cylindrical wall means of the clamp.

4. An attachment for power drills and like tools, comprising: a resilient clamp having internal cylindrical wall means and adapted to be telescopically mounted to the sleeve circumscribing the chuck of a drill; a lateral projection carried by said clamp; a hollow toroidal member of transparent material substantially filled with a liquid to form an air bubble; means for detachably mounting said toroidal member to said projection for coaxial rotation, said rotational axis normally intersecting the longitudinal axis of said cylindrical wall means; index means carried by said toroidal member and defining normally intersecting planes; and first aligning means carried by said projection and coacting with second aligning means movable with said toroidal member for orienting said toroidal member whereby said toroidal member may be rotated to a position in which the one plane defined by said index means passes through the longitudinal axis of said cylindrical wall means of the clamp, said second aligning means comprising tabs radially projecting from a disc closing the opening of said toroidal member, said disc being interlockingly engaged with said toroidal member and coacting with said mounting means to hold said toroidal member against accidental rotation.

5. In an attachment for power drills, comprising: a resilient clamp having internal cylindrical wall means and adapted to be telescopically mounted to the sleeve circumscribing the chuck of a drill with the cylindrical wall means thereof concentric with the surface of the sleeve; a hollow toroidal member of transparent material substantially filled with a liquid to form an air bubble; a ball within said level and freely rollable within said liquid; means for mounting said toroidal member to said clamp for rotation about an axis coincident with the axis of said toroidal level and normally intersecting the longitudinal axis of said cylindrical wall means; index marks carried about said toroidal member; aligning marks carried by said clamp and coacting with said index marks to orient said toroidal member relative to the longitudinal axis of said cylindrical wall means; and means coacting with said mounting means for holding said toroidal member against accidental rotation from a preselected oriented position.

6. An attachment for power drills and like tools, comprising: a resilient clamp having an internal cylindrical wall means and adapted to be telescopically mounted to the sleeve circumscribing the chuck of a drill; a lateral projection carried by said clamp; a hollow toroidal member of transparent material substantially filled with a liquid to form an air bubble; a ball within said toroidal member and freely rollable within said liquid; means for mounting said toroidal member to said projection; an elongate index member; means securing said index member to said mounting means for rotation about an axis normally intersecting the longitudinal axis of said cylindrical wall means; and index means fixedly carried by said mounting means and defining normally intersecting planes, one of said planes passing through said longitudinal axis, said index means coacting with said ball and bubble to orient said drill in a position in which a drill bit mounted in the chuck thereof extends normal to a horizontally or vertically arranged work surface, the bubble and ball coacting with said rotatably mounted index member for re-orienting said drill whereby the latter may be returned to a predetermined position in which the drill bit extends normal to an angularly arranged work surface.

References Cited in the file of this patent

UNITED STATES PATENTS

| 817,467   | Chase   | Apr. 10, 1906 |
| 1,159,516 | Machin  | Nov. 9, 1915  |
| 1,221,738 | Isom    | Apr. 3, 1917  |

FOREIGN PATENTS

| 114,510 | Switzerland | Apr. 1, 1926  |
| 392,972 | France      | Feb. 21, 1908 |
| 865,697 | Germany     | Sept. 5, 1953 |
| 981,248 | France      | May 23, 1951  |